US011157986B2

(12) United States Patent
Stamboni et al.

(10) Patent No.: US 11,157,986 B2
(45) Date of Patent: Oct. 26, 2021

(54) GENERATING A TABLE OF RECOMMENDATIONS

(71) Applicant: International Business Machines Corporation, Armonk, NY (US)

(72) Inventors: Diane M. Stamboni, Poughkeepsie, NY (US); John S. Werner, Fishkill, NY (US); Nicholas G. Danyluk, Long Island City, NY (US); Sarah Wu, Kingston, NY (US); Sneha M. Varghese, Fishkill, NY (US); Kavita Sehgal, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 362 days.

(21) Appl. No.: 15/977,151

(22) Filed: May 11, 2018

(65) Prior Publication Data

US 2019/0347704 A1 Nov. 14, 2019

(51) Int. Cl.
*G06Q 30/06* (2012.01)
*H04W 4/029* (2018.01)
*G06Q 10/10* (2012.01)

(52) U.S. Cl.
CPC ..... *G06Q 30/0631* (2013.01); *G06Q 10/1093* (2013.01); *G06Q 30/0633* (2013.01); *G06Q 30/0639* (2013.01); *H04W 4/029* (2018.02)

(58) Field of Classification Search
None
See application file for complete search history.

(56) References Cited

U.S. PATENT DOCUMENTS

| 7,734,514 | B2 | 6/2010 | Robinson et al. |
| 8,468,064 | B1 | 6/2013 | Trandal et al. |
| 9,595,062 | B2 | 3/2017 | Goulert |
| 2002/0174021 | A1 | 11/2002 | Chu et al. |
| 2005/0159974 | A1 | 7/2005 | Moss et al. |
| 2006/0259358 | A1 | 11/2006 | Robinson et al. |

(Continued)

OTHER PUBLICATIONS

Authors: Disclosed Anonymously, "Application That Optimizes Method of Obtaining Items From a Shopping List", IPCOM000225646D, IBM Confidential, Feb. 22, 2013, 6 pgs. (ip.com).

(Continued)

*Primary Examiner* — Cory W Eskridge
(74) *Attorney, Agent, or Firm* — Cantor Colburn LLP.; Teddi Maranzano

(57) ABSTRACT

In one example implementation according to aspects of the present disclosure, a computer-implemented method includes receiving a list of items to be purchased by a user. The method further includes performing an analysis of the list of items based at least in part on a cost for each item of the list of items at each of a plurality of stores, a distance of travel to each of the plurality of stores, and promotional discounts for one or more of the items of the list of items at each of the plurality of stores. The method further includes generating a table of recommendations based on the analysis. Each recommendation of the table of recommendations can include a description, a total travel distance, and a total cost.

19 Claims, 8 Drawing Sheets

| # | Description | Total Distance/ Time | Cost |
|---|---|---|---|
| 1 | 3 Stores – All items, 1 store must wait until Wednesday | 34 miles 1:30 | $50 |
| 2 | 4 Stores – All items | 37 miles 1:45 | $54 |
| 3 | 1 Store – Missing 2 items from shopping list | 28 miles 0:55 | $56 |
| 4 | 1 Store – All items | 20 miles 1:10 | $64 |

(56) References Cited

U.S. PATENT DOCUMENTS

| | | | |
|---|---|---|---|
| 2007/0150369 A1* | 6/2007 | Zivin | G06Q 30/0631 |
| | | | 705/26.64 |
| 2010/0198700 A1* | 8/2010 | Ramaswamy | G06Q 30/0601 |
| | | | 705/26.1 |
| 2011/0045852 A1* | 2/2011 | Kovach | G06Q 30/02 |
| | | | 455/466 |
| 2012/0123673 A1* | 5/2012 | Perks | G06F 16/29 |
| | | | 701/426 |
| 2013/0046624 A1 | 2/2013 | Calman et al. | |
| 2013/0246323 A1* | 9/2013 | Athas | G06Q 30/0631 |
| | | | 706/46 |
| 2014/0067564 A1 | 3/2014 | Yuan | |
| 2014/0156450 A1* | 6/2014 | Ruckart | G06Q 30/0633 |
| | | | 705/26.8 |

OTHER PUBLICATIONS

Authors: IBM et al., "Creating a Calendar or Route Plan in Accordance to External Conditions", IPCOM000182857D, IBM Confidential, May 7, 2009, 3 pgs. (ip.com).

\* cited by examiner

| # | Description | Total Distance/ Time | Cost |
|---|---|---|---|
| 1 | 3 Stores – All items, 1 store must wait until Wednesday | 34 miles 1:30 | $50 |
| 2 | 4 Stores – All items | 37 miles 1:45 | $54 |
| 3 | 1 Store – Missing 2 items from shopping list | 28 miles 0:55 | $56 |
| 4 | 1 Store – All items | 20 miles 1:10 | $64 |

GENERATING A TABLE OF RECOMMENDATIONS

BACKGROUND

The present invention generally relates to data processing systems, and more specifically, to generating a table of recommendations.

Many individuals will, from time to time, conduct a process of developing a shopping list of items to be purchased from merchants in a particular area and then shop for those items. Typically, creating the shopping list is a manual process whereby the list is made on a piece of paper and, once the list is completed, the individual sets out to fulfill the list by acquiring the listed items. Even the most homogeneous of lists (such as lists for buying groceries, lists for buying household products, lists for buying clothing, and so forth) can often result in buying items from multiple merchants because of differences such as which items are on sale, which items are in inventory, the location of the merchant, and the like.

SUMMARY

Embodiments of the present invention are directed to a computer-implemented method for generating a table of recommendations. A non-limiting example of the computer-implemented method includes receiving, by a processing device, a list of items to be purchased by a user. The method further includes performing, by the processing device, an analysis of the list of items based at least in part on a cost for each item of the list of items at each of a plurality of stores, a distance of travel to each of the plurality of stores, and promotional discounts for one or more of the items of the list of items at each of the plurality of stores. The method further includes generating, by the processing device, a table of recommendations based on the analysis. Each recommendation of the table of recommendations can include a description, a total travel distance, and a total cost.

Embodiments of the present invention are directed to a system. A non-limiting example of the system includes a memory comprising computer readable instructions and a processing device for executing the computer readable instructions for performing a method for generating a table of recommendations. A non-limiting example of the method includes receiving, by the processing device, a list of items to be purchased by a user. The method further includes performing, by the processing device, an analysis of the list of items based at least in part on a cost for each item of the list of items at each of a plurality of stores, a distance of travel to each of the plurality of stores, and promotional discounts for one or more of the items of the list of items at each of the plurality of stores. The method further includes generating, by the processing device, a table of recommendations based on the analysis. Each recommendation of the table of recommendations can include a description, a total travel distance, and a total cost.

Embodiments of the invention are directed to a computer program product. A non-limiting example of the computer program product includes a computer readable storage medium having program instructions embodied therewith. The program instructions are executable by a processing device to cause the processing device to perform a method for generating a table of recommendations. A non-limiting example of the method includes receiving, by the processing device, a list of items to be purchased by a user. The method further includes performing, by the processing device, an analysis of the list of items based at least in part on a cost for each item of the list of items at each of a plurality of stores, a distance of travel to each of the plurality of stores, and promotional discounts for one or more of the items of the list of items at each of the plurality of stores. The method further includes generating, by the processing device, a table of recommendations based on the analysis. Each recommendation of the table of recommendations can include a description, a total travel distance, and a total cost.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 depicts an improved interface that includes a table of recommendations according to one or more embodiments of the present invention.

Figure 1:
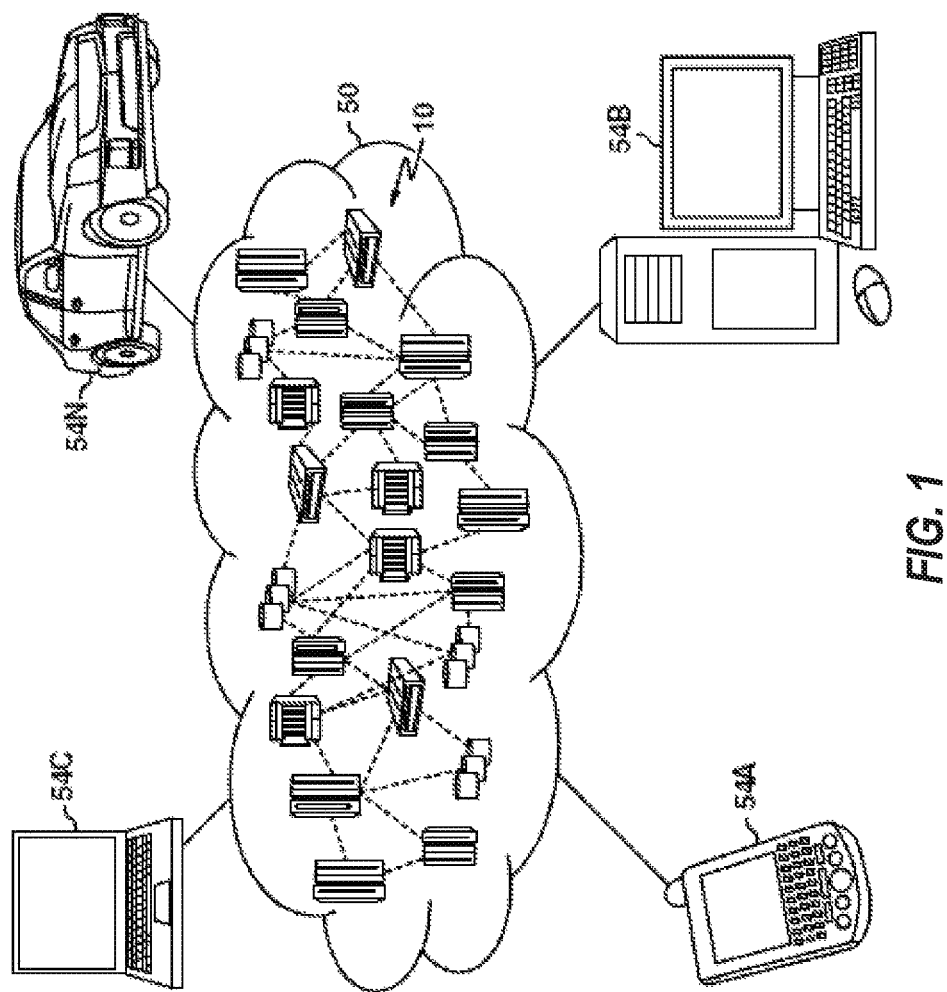
FIG. 1 depicts a cloud computing environment according to aspects of the present disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
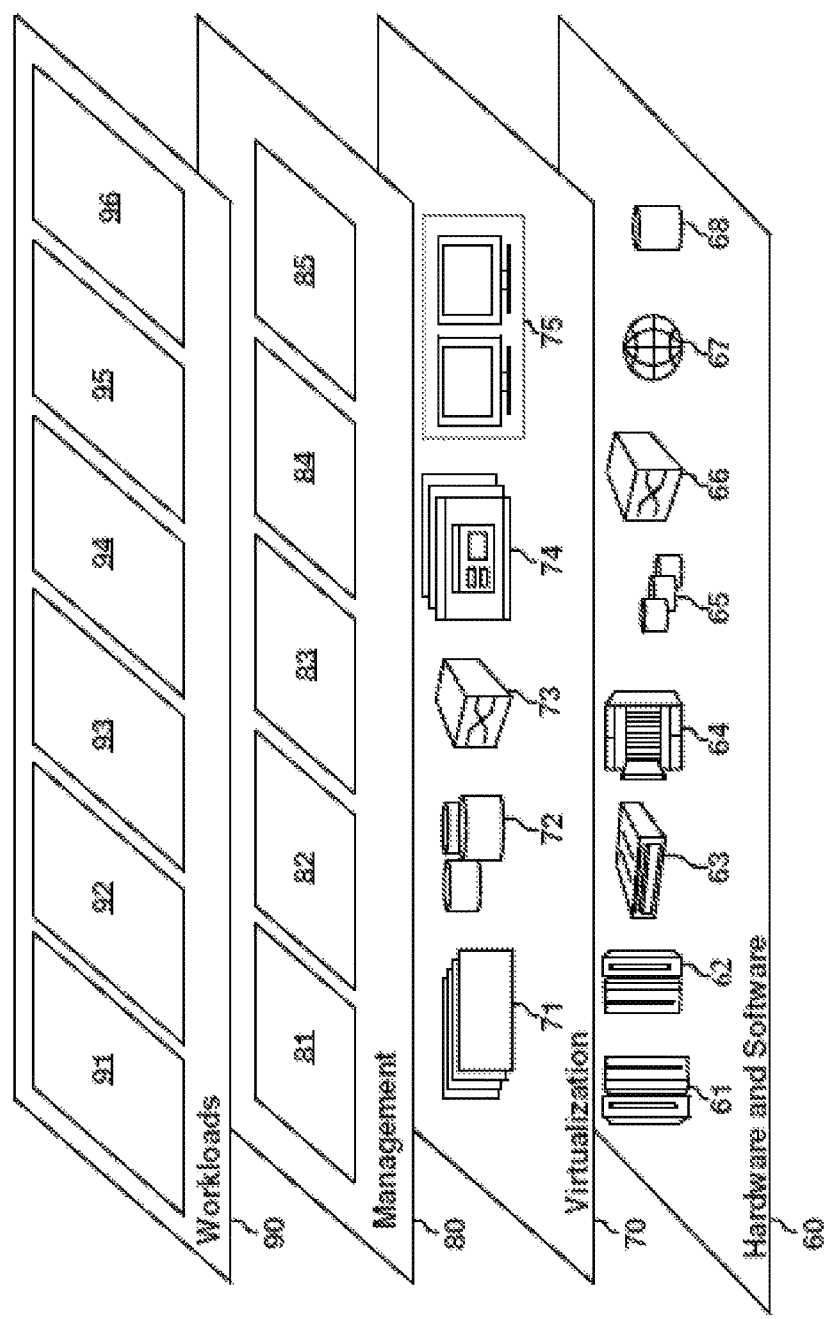
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a table of recommendations 96.

Figure 3:
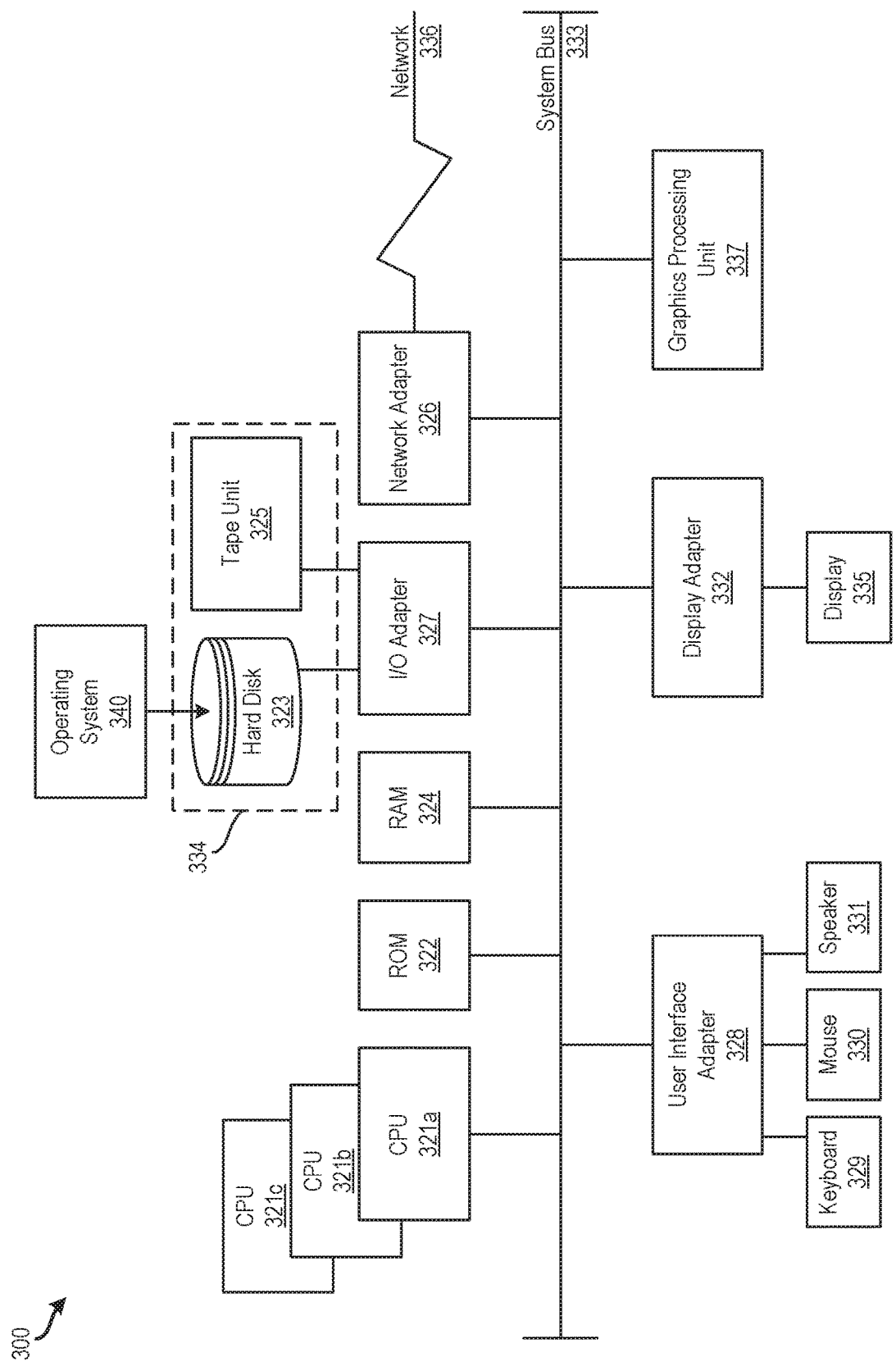
FIG. 3 depicts a block diagram of a processing system for implementing the techniques described herein according to aspects of the present disclosure.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321$a$, 321$b$, 321$c$, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a communications adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. A network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the invention, users (e.g., consumers) often buy desired items from multiple merchants because of differences such as which items are on sale, which items are in inventory, the location of the merchant, and the like. For example, different stores often feature promotional discounts on different items at various times, and these promotional discounts can vary from store to store. Promotional discounts may be circulated as advertisements to users through newspapers, online, direct mailings, etc., to encourage users to shop at a particular store.

It can be quite time consuming for an individual to compare each of these advertisements for each store. Moreover, human error can easily occur when deciding which store offers the best discount or value to a user. For example, some promotional discounts can include conditions (e.g., must buy 3 of a particular item or group of items to get a discount, total purchase must be over $25 for the discount to apply, etc.) where a user may miss or misinterpret. Dates can also be confusing as some promotions within an advertisement can have different validity dates (e.g., one promotion is effective this week and another promotion is effective next week).

Moreover, the distance and mode of transportation to a store can also contribute to the overall cost of items. For example, traveling a great distance to buy a discounted item offsets the discount through consumption of fuel, the user's time, etc. Accordingly, some users may desire to minimize cost while other users may value minimizing time. For example, users more concerned with minimizing cost may be willing to travel farther distances and/or to a greater number of stores than users who are more concerned with minimizing time spent stopping/driving. Other uses may want a balance between minimizing cost and minimizing time.

Turning now to an overview of the aspects of the invention, one or more embodiments of the invention address the above-described shortcomings of the prior art by providing recommendations that consider travel time and promotional discounts with respect to various stores. According to one or more embodiments of the present invention, a list of items to be purchased is received from a user. An analysis of the list of items is performed. The analysis considers one or more of a cost for each item of the list of items at each of a plurality of stores, a distance of travel to each of the plurality of stores, and promotional discounts for one or more of the items of the list of items at each of the plurality of stores. Other factors can also be considered, such as user preferences. A table of recommendations is then generated based on the analysis. The table of recommendations includes various recommendations, and each recommendation includes one or more of a description, a total travel distance, and a total travel cost. Other information can be included in the table of recommendations, such as travel routes, which (or how many) items are available or unavailable, etc.

The above-described aspects of the invention address the shortcomings of the prior art by providing an improved interface for presenting a table of recommendations to a user to enable the user to quickly and easily select between recommendations for shopping. The recommendations can include information such as a number of stores to visit. The user can select the number of stores to automatically load route information into a navigation application to provide the user with instructions to navigate to the store. This improved interface simplifies existing processes for manually entering route information, for example.

Figure 4A:
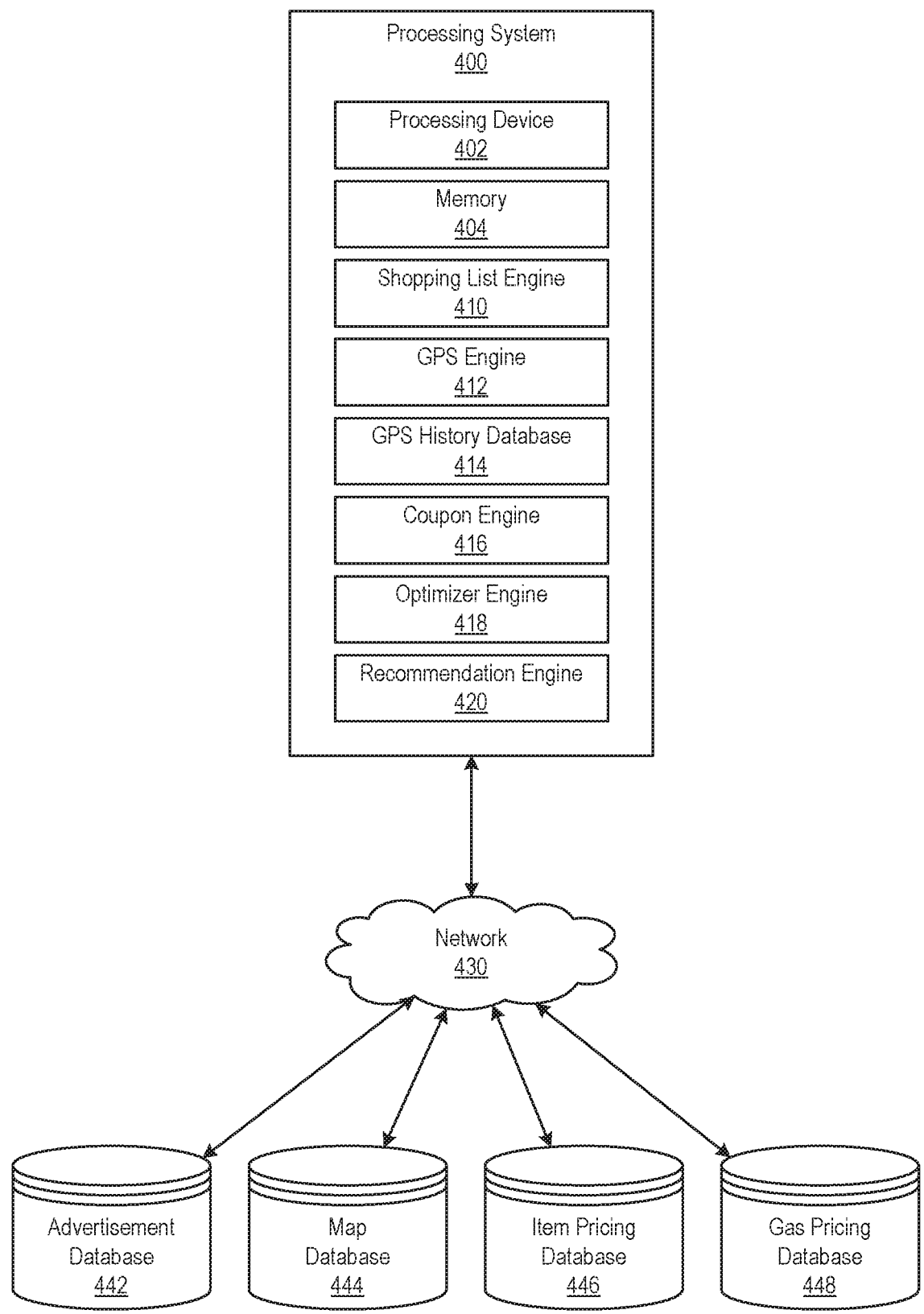
FIG. 4A depicts a block diagram of a processing system for generating a table of recommendations for purchasing items from a list of items according to one or more embodiments of the present invention.

FIG. 4A depicts a block diagram of a processing system 400 for generating a table of recommendations for purchasing items from a list of items according to one or more embodiments of the present invention. The processing system 400 includes various components and engines, such a processing device 402, a memory 404, a shopping list engine 410, a global positioning system (GPS) engine 412, a GPS history database 414, a coupon engine 416, an optimizer engine 418, a recommendation engine 420. The processing system 400 can transmit data to and/or receive data from various sources of data via a network 430. The sources of data can include an advertisement database 442, a map database 444, an item pricing database 446, and a gas pricing database 448. The databases 442, 444, 446, 448 can be stored on a processing system, such as a computer server (e.g., the processing system 300), or distributed in a cloud computing environment (e.g., the cloud computing environment 50).

The various components, modules, engines, etc. described regarding FIG. 4A can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus, a system memory (e.g., the memory 404) can store program instructions that, when executed by the processing device 402, implement the engines described herein. Other engines can also be utilized to include other features and functionality described in other examples herein.

The shopping list engine 410 receives or generates a list of items to be purchased. For example, a user can manually enter items to create the list of items, the user can upload an existing list (such as from an email, from another application, from a printed or written list by taking a picture of the list, etc.). According to one or more embodiments of the present invention, the list can be automatically generated, such as based on user habits and/or historical purchases. For example, the shopping list engine 410 can detect that a user purchases a particular loaf of bread each week and can automatically add this item to the list. The list can be automatically generated based on inventory considerations. For example, a smart appliance like a refrigerator can monitor items contained therein and can add items to the list of items to be purchased when an item is low (e.g., a bottle of sauce is nearly empty), when an item has been removed/used, etc.).

The GPS engine 412 determines the user's current location using global positioning system data. The GPS history database 414 stores historic data that tracks the user's location over time to determine when and where a user travels. From this historic data, patterns can be determined (e.g., the user travels from home to work each weekday morning at approximately the same time, the user travels to a specific location each Thursday afternoon, etc.).

The coupon engine 416 enables coupons to be entered by the user and/or automatically extracts coupon information from various sources, such as store circulars, online advertisements, etc. For example, the coupon engine 416 can receive store advertisement data from the advertisement database 442 via the network 430.

The optimizer engine 418 determines optimized recommendations based on costs, travel distance, travel time, number of stores, the location of the stores, a location of the user, promotional discounts, and the like. The recommendation engine 420 presents an improved user interface to the user to display a table of recommendations (e.g., the table of recommendations 701 of FIG. 7). According to one or more embodiments of the present invention, the optimizer engine 418 can suggest to a user that the user purchase a particular item at a certain store based on the user's historic schedule. For example, if a user historically tends to pass a certain store on the way home from work each day, it may be suggested to the user to stop at that store and purchase an item from their list, such as if the item is on sale that day. If the item is, for example, a frozen or cold item, the optimizer engine 418 may not notify the user on the way to work but instead notify the user on the way home.

Figure 4B:
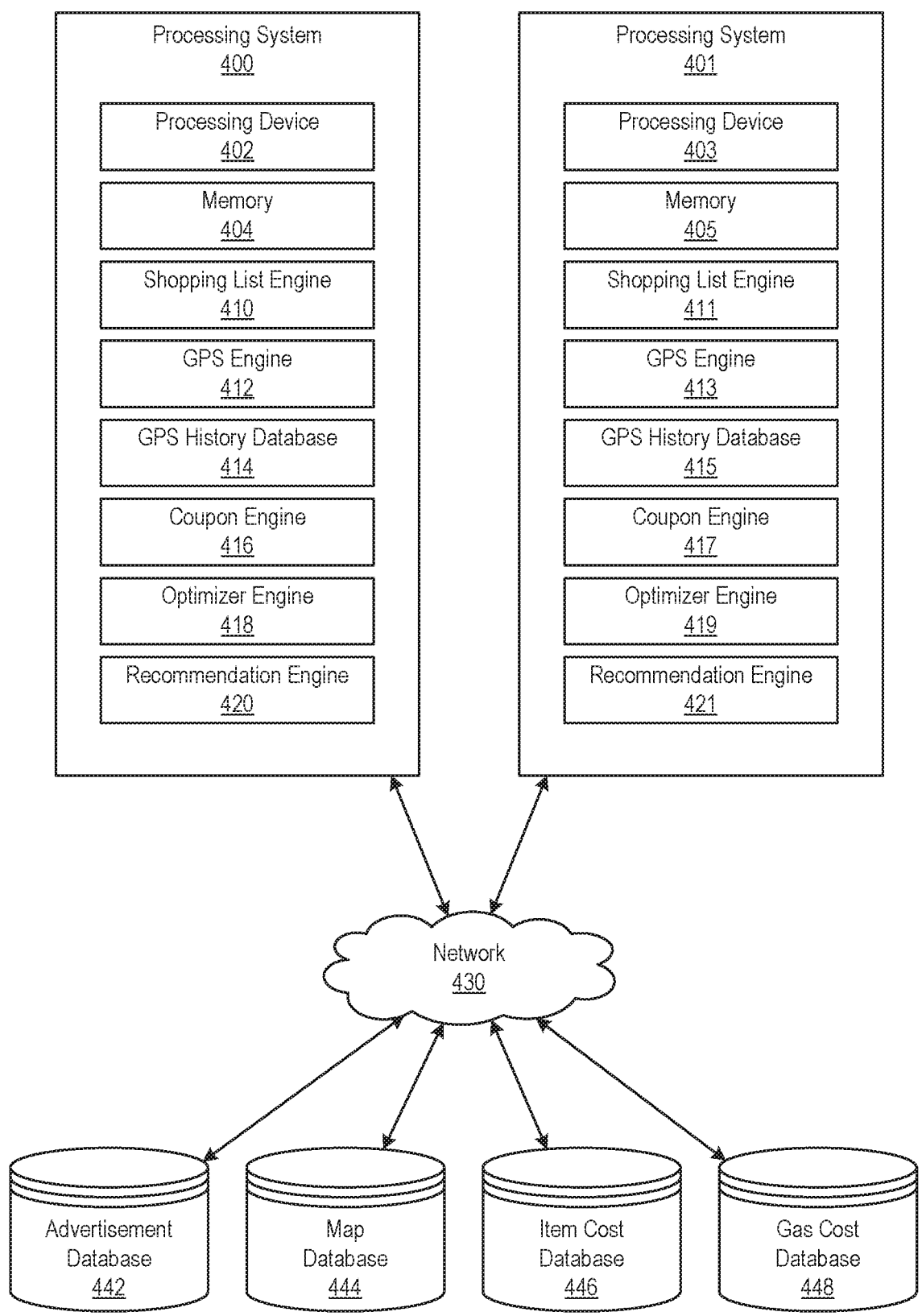
FIG. 4B depicts a block diagram of processing systems for generating a table of recommendations for purchasing items from a list of items according to one or more embodiments of the present invention.

FIG. 4B depicts a block diagram of processing systems 400, 401 for generating a table of recommendations for purchasing items from a list of items according to one or more embodiments of the present invention. The processing system 401 can be configured similarly to the processing system 400. For example, in the embodiment of FIG. 4B, the processing system 401 includes a processing device 403, a memory 405, a shopping list engine 411, a global positioning system (GPS) engine 413, a GPS history database 415, a coupon engine 417, an optimizer engine 419, a recommendation engine 421, which perform functions similar to those described with respect to the corresponding components of the processing system 400. However, it should be appreciated that the processing systems 400, 401 can include additional components and/or can exclude one or more of the components depicted in the figures.

The arrangement of the embodiment of FIG. 4B enables multiple shoppers to share a list of items for shopping/purchasing purposes. For example, the processing system 400 can be associated with a first user and the processing system 401 can be associated with a second user. The list of items can be shared between the processing systems 400, 401 to enable the first and second user to each purchase items on the list through "co-shopping" (multiple users shopping using the same list of items). For example, the first and second users can visit different stores (or different areas of the same store) to shop for the items on the list of items. When an item from the list of items is obtained by one shopper, it can be indicated on the list of items that the item has been obtained and thus need not be obtained by the other shopper.

The optimizer engines 418, 419 can perform analysis of the list of items with respect to the two separate individuals. For example, if the first user and the second user are located in separate geographic locations (e.g., different areas of town, different cities, etc.), the users' individual locations can be considered (based on the GPS engines 412, 413) when performing the analysis. An item may be cheaper and closer to the second user, for example, while another item may be cheaper and closer to the first user. In this case, the recommendation engine, 420, 421 can generate separate tables of recommendations for each user to indicate which user should purchase which items from the list of items.

Figure 5:
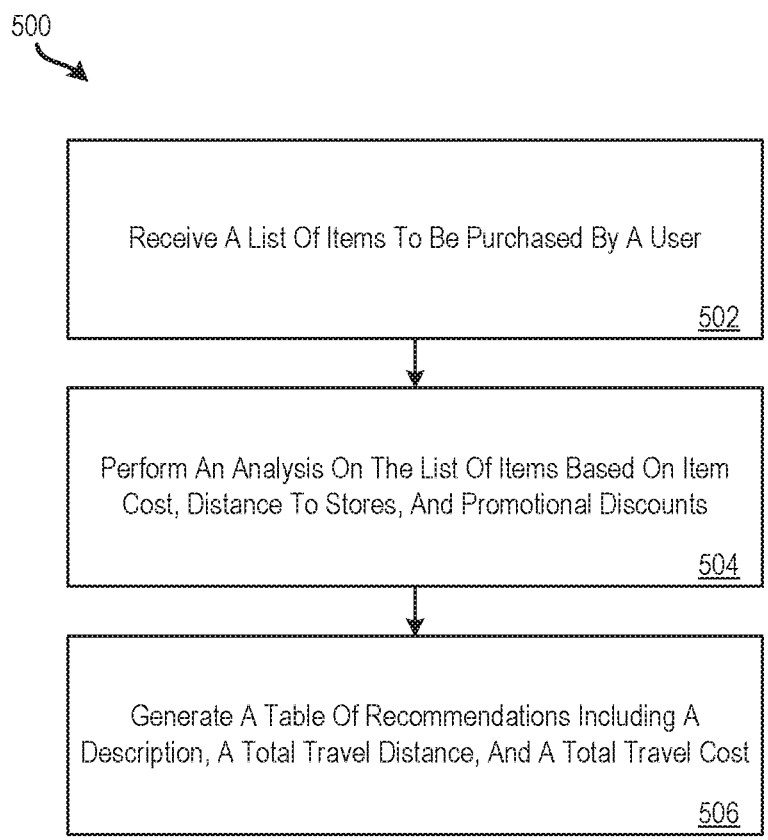
FIG. 5 depicts a flow diagram of a method for generating a table of recommendations according to examples of the present disclosure.

FIG. 5 depicts a flow diagram of a method 500 for generating a table of recommendations according to examples of the present disclosure. The method 500 can be performed using any suitable processing device (e.g., the processor 321, the processing device 402, etc.) and/or any suitable processing system (e.g., the processing system 300, the processing system 400, etc.).

At block 502, the shopping list engine 410 receives a list of items to be purchased by a user. The list of items can be manually provided by the user or automatically generated.

At block 504, the optimizer engine 418 performs an analysis of the list of items. The analysis is based on various factors, such as cost for each item on the list of items at each of a plurality of stores (e.g., a physical retail store, an online e-commerce store, etc.), a distance of travel to each of the plurality of stores, and promotional discounts for one or more of the items at each of the plurality of stores. The analysis can also be based on factors such as shipping and handling costs in the case of online e-commerce stores. For example, when shipping and handling costs are included, an item that is cheaper online may end up being more expensive than an item in a physical store. Other factors can also be considered in the analysis, including gas price, traffic, user habits, a current location of the user (i.e., from the GPS engine 412), historical GPS data of the user (i.e., from the GPS history database 414), a priority associated with each of the items, and the like.

Subsequent to the analysis, the recommendation engine 420 generates a table of recommendations at block 506. The table of recommendations (e.g., the table 701 of FIG. 7) can include a description of items (e.g., how many stores are suggested, how many items can or cannot be purchased from the list of items, etc.), a total travel distance, and a total cost. The description can include a total number of stores to be visited and/or a number of items of the list of items that can be purchased at those stores. The table of recommendations can be displayed as a graphical user interface on a user device associated with a user.

Additional processes also may be included. For example, according to one or more embodiments of the present invention, the method 500 can include tracking a location of the user and updating the analysis based on the location of the user relative to each of the stores. The table of recommendations can then be updated based on the updated analysis. According to one or more embodiments of the present invention, a preference of the user is received, and the analysis is performed using the preference of the user. The preference is provided by the user to define conditions that can be used to enhance the analysis. Examples of preferences include a maximum number of stores, a maximum travel distance, a maximum travel duration, a maximum cost, a minimum number of items to purchase from the list, and the like.

According to one or more embodiments of the present invention, the table of recommendations can include a route recommendation. The route recommendation is based on a location of a subset of the plurality of stores (i.e., the stores selected for purchasing the items of the list of items), a current location of the user, traffic information, and historical location information of the user. One or more of the recommendations can be selected by a user such that, when a recommendation is selected, a navigation application is initiated. The route information associated with the route recommendation is loaded into the navigation application. The navigation application provides directions to a user to enable the user to navigate to a subset of the plurality of stores to purchase the items. Loading the route information to the navigation application from the table of recommendations improves the user experience when using the present techniques on the user's computing device. For example, because the route information is loaded automatically into the navigation application, the user need not manually launch the application and manually enter the information for the route into the navigation application. This represents an improved user interface and an approved approach versus traditional approaches of manually launching the application and manually entering the route information.

It should be understood that the process depicted in FIG. 5 represents an illustration, and that other processes may be added or existing processes may be removed, modified, or rearranged without departing from the scope and spirit of the present disclosure.

Figure 6:
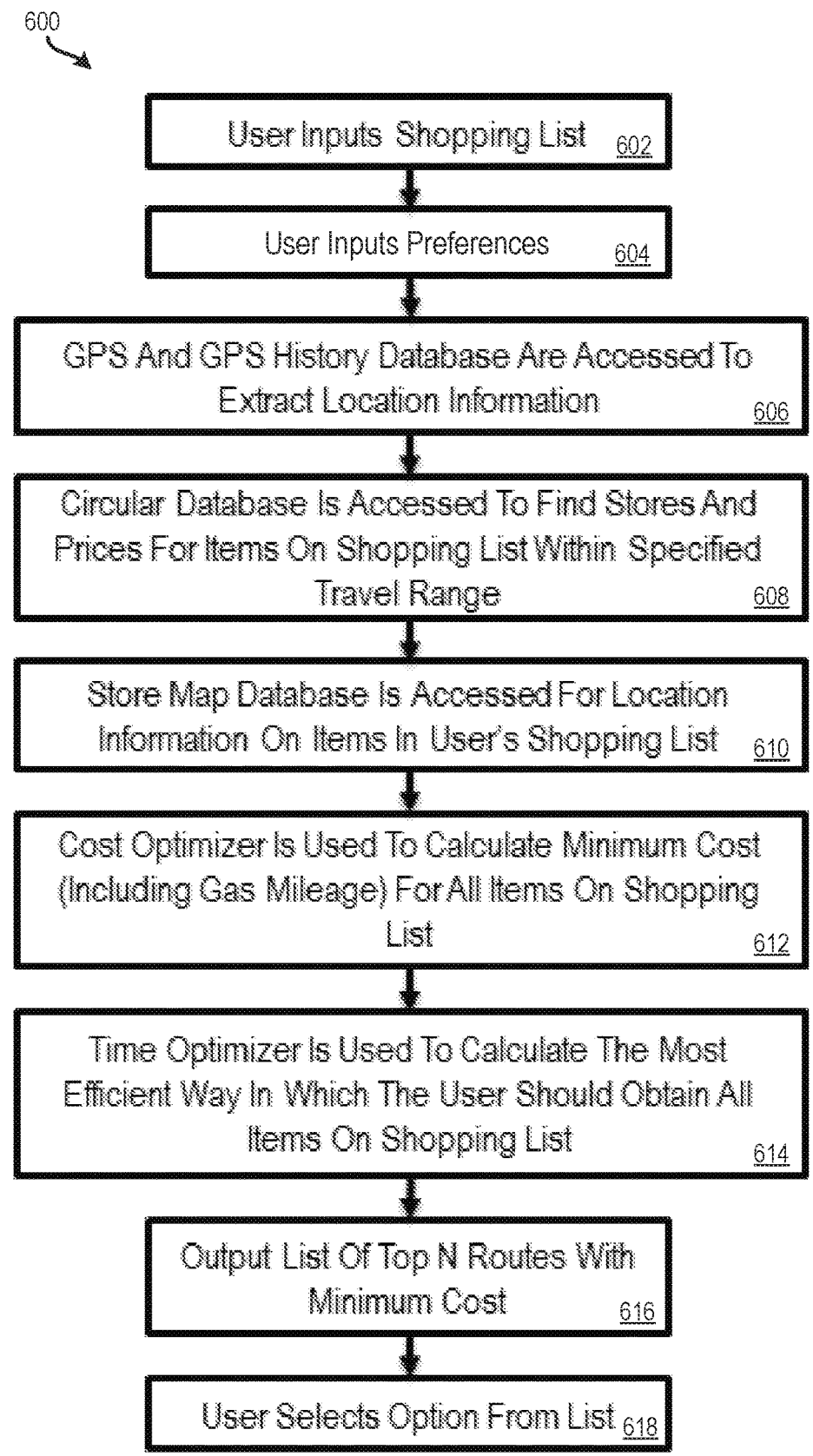
FIG. 6 depicts a flow diagram of a method for generating a table of recommendations according to examples of the present disclosure.

FIG. 6 depicts a flow diagram of a method 600 for generating a table of recommendations according to examples of the present disclosure. The method 500 can be performed using any suitable processing device (e.g., the processor 321, the processing device 402, etc.) and/or any suitable processing system (e.g., the processing system 300, the processing system 400, etc.).

At block 602, a user inputs a shopping list into the shopping list engine 410. The shopping list could be any list of items that the user wishes to purchase (e.g., grocery list, birthday or holiday gift list, etc.). To enable optimal decisions to be made regarding which items to purchase at which stores, product amounts can be included in the list. The amounts can be retrieved from the item pricing database 446 or another suitable data store that contains current pricing data. Coupons, if any, can also be scanned/entered using the coupon engine 416. These may represent manufacturer coupons or other coupons and may or may not be specific to a certain store. Historic lists of past purchases or past lists can also be stored and analyzed such that suggestions can be made to the user if a product that the user is known to buy is on sale but is not included in the user's current list.

At block 604, the user can enter preferences, such as the maximum distance the user is willing to travel, a preference for particular stores, a maximum amount of time the user is willing to spend shopping, a maximum number of stores the user is willing to visit, and other preferences.

At block 606, the user's current location is determined using the GPS engine 412, and historic GPS data is accessed from the GPS history database 414 to determine common locations that the user typically visits (e.g., work, home, friend's house, certain stores, etc.). For example, if the user's office is an hour away from the user's home; the user could shop for some items near work and other items near home in order to purchase items at the cheapest prices, visit the least number of stores, etc. and the shopping at each location may occur on different days. Calendar events may also be considered to determine if a user will be near a particular store in the future. For example, if the user has an appointment near a particular store next week, and that store has a discount for a product on the user's list, it may be suggested to the user that the user wait until next week to purchase the item at the sore near the user's appointment location.

At block 608, an advertisement (i.e., circular) database (e.g., the advertisement database 442) is accessed to locate stores and prices for items on the shopping list within the user's preferences (from block 604). Promotional information can be extracted from store-provided *circulars* or advertisements, such as online advertisements, e-mail advertisements, and the like, and stored in the advertisement database 442. In some examples, a user can capture an image of an advertisement or circular using a camera or other image capturing device, such as a camera on the user's smartphone. The promotional information can be extracted from the image and stored in the advertisement database 442. The advertisement database 442 can be accessed not only by the user, but by other users as well according to one or more embodiments of the present invention.

At block 610, a map database (e.g., the map database 444) is accessed to determine the location of list items within stores. Accordingly, an in-store route can be determined that considered the types of items (e.g., perishable and/or frozen items in a grocery store should be saved for last). For example, ice cream should not be procured first if the list contains many items (e.g., 20 items, 35 items, etc.) but can be procured first if the list contains few items (e.g., 4 items, 7 items, etc.). In this way, the user's in-store route can be determined and provided to the user, such as on the table of recommendations 701 of FIG. 7. In the case of multiple stores, it may be determined to procure perishable and/or frozen items at the last store.

At block 612, the optimizer engine 418 analyzes the extracted pricing information, GPS data, and advertisement information to calculate a cost for the items on the shopping list. The optimizer engine 418 considers the distance between stores, gas costs (based, for example, on the gas pricing database 448), and gas mileage. If a sale is dependent on a total dollar amount spent, the optimizer engine 418 estimates the total of the items on the list to be purchased at a particular store based on the extracted pricing information to determine if the user qualifies for the sale. The optimizer engine 418 can suggest to the user an optimal time to shop (e.g., certain sales may go into effect at a later date, it may be better for a user to wait until the user is near a particular area based on the user's calendar or cognitively learned schedule, etc.). If a future date is suggested, gas predictions may be used based on historic gas prices and recent trends in gas prices. If the list of items contains generic items (e.g., ketchup) without specifying a particular brand, multiple brands of that item can be considered for cost optimization by the optimizer engine 418. Alternatively, if previous purchasing information is available and a user tends to purchase a particular brand of the generically listed item, the cost optimizer may presume the user wishes to purchase that brand.

At block 614, the optimizer engine 418 calculates an optimal route to obtain the items from the list to determine a most efficient way in which the user should shop. The optimizer engine 418 can utilize the map database 444 to determine the location of items within the store and can provide an optimal route within each store for the user to obtain items that are within each of the stores. The optimizer engine 418 can also calculate a distance between stores that are suggested to be visited based on the user's current location (or estimated starting point) using GPS location information, historic GPS data, and/or calendar information of the user. The optimizer engine 418 can also consider how crowded a store may be based on popular times for users to be in a store, so the level of business can be factored into the expected time within the store. The optimizer engine 418 can also consider a user's prior history of time spent within specific stores, the number of items they purchased, and the time they were in the store, which can be learned, to further optimize the calculation of time within the store. For example, a first user may walk slower than a second user; the second user may obtain ten items in ten minutes while it would take the first user twenty minutes to obtain the same ten items. The optimizer engine 418 can iterate through multiple scenarios to generate the recommendations.

At block 616, the recommendation engine 420 generates an output list based on user preferences of either the top optimized cost lists (e.g., the table 701 of FIG. 7) or a top optimized time list as a table of recommendations. The table of recommendations can include, for example, total costs, a number of stores, total time, suggested dates to shop, and specific items (i.e., for generic items on the user's list). Users can specific certain preferences, such as in a settings menu or user profile, such as: do not show options with more than three stores; do not show options that require shopping on a future date; do not show options where the total cost is more than a certain amount than the minimum calculated cost; do not shop at certain stores; do not purchase certain brands of items; preferred stores; preferred brands; preferred shopping days; etc.

At block 618, the user can select a recommendation from the table of recommendations. The user can select the recommendation based on different factors. For example, the user can select the minimum cost option which suggests multiple stores. The user can select the fastest option if they are in a rush (e.g., shop at a single store even though the cost may be higher than visiting multiple stores). A user can also select a recommendation that enables them to procure each item in one day or by a certain date or to select an option that omits an item from the list to avoid traveling to an extra store.

Additional processes also may be included, and it should be understood that the process depicted in FIG. 6 represents an illustration, and that other processes may be added or existing processes may be removed, modified, or rearranged without departing from the scope and spirit of the present disclosure.

FIG. 7 depicts an improved interface 700 that includes a table of recommendations ("table") 701 according to one or more embodiments of the present invention. The table 701 includes a number of recommendations 711, 712, 713, 714. Each recommendation has a description, total distance/time, and cost associated therewith. For example, recommendation 711 contains the description "3 stores—all items, 1 store must wait until Wednesday." The description for recommendation 711 recommends the user visiting three stores to purchase all items, but one item cannot be purchased until Wednesday. The total distance/time associated with recommendation 711 is thirty-four miles (distance) and one hour, thirty minutes travel time. The cost associated with recommendation 711 is $50 including travel.

Recommendation 712 contains the description "4 stores—all items" which notifies the user that he or she can purchase all the items by visiting four different stores with a travel distance of 37 miles and a total travel time of one hour forty-five minutes for a total cost of $54. While recommendation 712 requires more stores, more time, a greater distance, and a higher cost, all items are available now and the user does not have to wait until Wednesday in the case of recommendation 711. Depending on the item, this may be preferable to the user, or the user may be willing to wait until Wednesday to reduce cost/time/distance. According to one or more embodiments of the present invention, the user can select the description to initiate a summary interface that displays what items are not available, what stores to visit, etc. This provides the user with an additional improved interface that provides summary information that is easily accessible and understandable to the user, thereby providing an improved user experience. Other recommendations 713, 714 contain additional descriptions, total distance/times, and costs as depicted in FIG. 7.

According to one or more embodiments of the present invention, the table 701 can include a route recommendation. For example, if the user decides to select recommendation 711, the user can select the total distance/time cell associated with recommendation 711. When this cell is selected, a navigation application is initiated and route information associated with the route recommendation is loaded into the navigation application. This enables the navigation application to provide directions to the user to enable the user to navigate to the three stores identified in the recommendation 711. The route information can include a location of the stores, an order in which the stores should be visited (e.g., visit a store where frozen items are to be purchased last, visit during a time period when certain promotional prices/discounts are available, etc.).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processing device, a list of items to be purchased by a user;
receiving, by the processing device, an image of a promotional notice from a device associated with the user, the device comprising a camera to capture the image;
extracting, by the processing device, promotional information from the image of the promotional notice;
determining, by the processing device, a promotional discount for one or more of the items of the list of items based at least in part on the promotional information;
performing, by the processing device, an analysis of the list of items based at least in part on a cost for each item of the list of items at each of a plurality of stores, a distance of travel to each of the plurality of stores, and the promotional discount for one or more of the items of the list of items at each of the plurality of stores;
generating, by the processing device, a table of recommendations based on the analysis, each recommendation of the table of recommendations comprising a description, a total travel distance, and a total cost, wherein the table of recommendations is displayed as a graphical user interface on a user device associated with the user, and wherein the table of recommendations is configured to enable a user to select one of the recommendations; and responsive to the one of the recommendations being selected, initiating a navigation application and automatically loading route information associated with the selected one of the recommendations into the navigation application.

2. The computer-implemented method of claim 1, further comprising:
tracking a location of the user;
updating the analysis based at least in part on the location of the user relative to each of the plurality of stores; and
updating the table of recommendations based at least in part on updating the analysis.

3. The computer-implemented method of claim 1, further comprising:
receiving, by the processing device, a preference of the user; and
performing the analysis is further based at least in part on the preference of the user.

4. The computer-implemented method of claim 3, wherein the preference comprises at least one of a maximum number of stores, a maximum travel distance, a maximum travel duration, and a maximum cost.

5. The computer-implemented method of a claim 1, wherein at least one of the stores of the plurality of stores is a physical store, and wherein at least one of the stores of the plurality of stores is an e-commerce store.

6. The computer-implemented method of claim 1, wherein the description comprises a total number of stores and a number of items of the list of items that can be purchased.

7. The computer-implemented method of claim 1, wherein a recommendation of the table of recommendations further comprises a route recommendation based on a location of a subset of the plurality of stores, a current location of the user, traffic information, and historical data of the user.

8. The computer-implemented method of claim 7, wherein, when the recommendation is selected, the navigation application is initiated and route information associated with the route recommendation is loaded into the navigation application, wherein the navigation application provides directions to a user to enable the user to navigate to a subset of the plurality of stores.

9. The computer-implemented method of claim 1, where performing the analysis is further based at least in part on a schedule of the user.

10. The computer-implemented method of claim 9, wherein the schedule of the user is determined based at least in part on a calendar of the user.

11. The computer-implemented method of claim 10, wherein the schedule of the user is determined based at least in part on historic data associated with the user.

12. A system comprising:
a memory comprising computer readable instructions; and
a processing device for executing the computer readable instructions for performing a method comprising:
receiving, by the processing device, a list of items to be purchased by a user;
receiving, by the processing device, an image of a promotional notice from a device associated with the user, the device comprising a camera to capture the image;
extracting, by the processing device, promotional information from the image of the promotional notice;
determining, by the processing device, a promotional discount for one or more of the items of the list of items based at least in part on the promotional information;
performing, by the processing device, an analysis of the list of items based at least in part on a cost for each item of the list of items at each of a plurality of stores, a distance of travel to each of the plurality of stores, and the promotional discount for the one or more of the items of the list of items at each of the plurality of stores;
generating, by the processing device, a table of recommendations based on the analysis, each recommendation of the table of recommendations comprising a description, a total travel distance, and a total cost, wherein the table of recommendations is displayed as a graphical user interface on a user device associated with the user, and wherein the table of recommendations is configured to enable a user to select one of the recommendations; and
responsive to the one of the recommendations being selected, initiating a navigation application and automatically loading route information associated with the selected one of the recommendations into the navigation application.

13. The system of claim 12, wherein the method further comprises:
tracking a location of the user;
updating the analysis based at least in part on the location of the user relative to each of the plurality of stores; and
updating the table of recommendations based at least in part on updating the analysis.

14. The system of claim 12, wherein the method further comprises:
receiving, by the processing device, a preference of the user; and
performing the analysis is further based at least in part on the preference of the user.

15. The system of claim 14, wherein the preference comprises at least one of a maximum number of stores, a maximum travel distance, a maximum travel duration, and a maximum cost.

16. The system of claim 12, wherein at least one of the stores of the plurality of stores is a physical store, and wherein at least one of the stores of the plurality of stores is an e-commerce store.

17. The system of claim 12, wherein the description comprises a total number of stores and a number of items of the list of items that can be purchased.

18. A computer program product comprising:
a computer readable storage medium having program instructions embodied therewith, the program instructions executable by a processing device to cause the processing device to perform a method comprising:
receiving, by the processing device, a list of items to be purchased by a user;
receiving, by the processing device, an image of a promotional notice from a device associated with the user, the device comprising a camera to capture the image;
extracting, by the processing device, promotional information from the image of the promotional notice;
determining, by the processing device, a promotional discount for one or more of the items of the list of items based at least in part on the promotional information;

performing, by the processing device, an analysis of the list of items based at least in part on a cost for each item of the list of items at each of a plurality of stores, a distance of travel to each of the plurality of stores, and the promotional discount for the one or more of the items of the list of items at each of the plurality of stores; and generating, by the processing device, a table of recommendations based on the analysis, each recommendation of the table of recommendations comprising a description, a total travel distance, and a total cost, wherein the table of recommendations is displayed as a graphical user interface on a user device associated with the user, and wherein the table of recommendations is configured to enable a user to select one of the recommendations; and responsive to the one of the recommendations being selected, initiating a navigation application and automatically loading route information associated with the selected one of the recommendations into the navigation application.

19. The computer-implemented method of claim 1, wherein extracting the promotional information from the image of the promotional notice comprises extracting a condition relating to a promotion, and wherein the route information comprises a location of each of the plurality of stores and an order in which each of the plurality of stores should be visited.

* * * * *